(12) United States Patent
Khare

(10) Patent No.: US 10,567,830 B2
(45) Date of Patent: Feb. 18, 2020

(54) METHOD AND SYSTEM FOR MANAGING INSERTION OF ADVERTISEMENTS

(75) Inventor: Rajendra Kumar Khare, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 1701 days.

(21) Appl. No.: 13/206,490

(22) Filed: Aug. 9, 2011

(65) Prior Publication Data

US 2013/0160045 A1 Jun. 20, 2013

(30) Foreign Application Priority Data

Aug. 9, 2010 (IN) .......................... 2286/CHE/2010

(51) Int. Cl.
*H04N 7/10* (2006.01)
*H04N 7/025* (2006.01)
*H04N 21/435* (2011.01)

(52) U.S. Cl.
CPC .................................. *H04N 21/435* (2013.01)

(58) Field of Classification Search
CPC ........... H04N 21/812; H04N 21/23424; H04N 21/2668; H04N 21/25891
See application file for complete search history.

(56) References Cited

U.S. PATENT DOCUMENTS

| | | | | |
|---|---|---|---|---|
| 2002/0095339 A1* | 7/2002 | Galloway | .............. | G06Q 30/02 705/14.41 |
| 2008/0022301 A1* | 1/2008 | Aloizos | .................. | G06Q 30/02 725/34 |
| 2009/0285551 A1* | 11/2009 | Berry | ................. | G06K 9/00711 386/249 |
| 2010/0037253 A1* | 2/2010 | Sheehan | .............. | H04H 20/103 725/31 |
| 2011/0145857 A1* | 6/2011 | Agarwal | ................ | G06Q 30/02 725/32 |

OTHER PUBLICATIONS

IBM, The Benefits of Cloud Computing, Jul. 2009, p. 3.*

* cited by examiner

*Primary Examiner* — Jason P Salce
(74) *Attorney, Agent, or Firm* — Barry Choobin; Patent 360 LLC

(57) ABSTRACT

A system and method for managing insertion of advertisements. The method includes receiving information associated with commercial breaks on a television or radio channel. Information associated with advertisements is acquired. The advertisements include one of regional advertisements and national advertisements. The method also includes determining the advertisements to be aired during the commercial breaks based on the information acquired and scheduling playing of the advertisements during commercial breaks. The system includes a user interface for providing information associated with commercial breaks and advertisements. The system also includes a media server for managing insertion of the advertisements. Further, the system includes one or more edge devices for fetching of the advertisements based on a schedule and inserting the advertisements for playing on the television or radio channel.

14 Claims, 3 Drawing Sheets

METHOD AND SYSTEM FOR MANAGING INSERTION OF ADVERTISEMENTS

This application claims priority from Indian Provisional Application Serial No. 2286/CHE/2010 filed on Aug. 9, 2010 entitled "METHOD AND SYSTEM FOR MANAGING INSERTION OF ADVERTISEMENTS", which is hereby incorporated in its entirety.

TECHNICAL FIELD

Embodiments of the disclosure relate to the field of advertising and more specifically to the field of advertising on television and radio.

BACKGROUND

Advertisements in television and radio are modes for advertisers to publicize their products and services. Television or radio channels charge advertisers based on the length of the advertisements, prime timeslots or reach of advertisements. Typically, a national advertisement that is aired across all regions would be sold for higher amount compared to regional advertisements that are limited to specific regions. However, combined revenue from airing different regional advertisements during same commercial break can potentially be higher than airing of one national advertisement across different regions. The availability of inventory and requirement of the advertisements are dynamic in nature. Moreover, they vary from region to region. It is a challenge to split allocation of advertisements during the commercial breaks between the national advertisements and the regional advertisements.

In the light of the foregoing discussion there is a need for a method and a system for managing insertion of the advertisements.

SUMMARY

The above-mentioned needs are met by a system and a method for managing insertion of advertisements.

An example of a method of managing insertion of advertisements includes receiving information associated with commercial breaks on a television or radio channel. The method also includes acquiring information associated with advertisements. The advertisements include one of regional advertisements and national advertisements. Further, the method includes determining the advertisements to be aired during the commercial breaks based on the information acquired. Further, the method also includes scheduling the playing of the advertisements during commercial breaks based on the determining.

An example of a system includes a user interface for providing information associated with commercial breaks and advertisements. The system also includes a media server. The media server includes a memory that stores instructions. The media server also includes a processor responsive to the instructions to receive information associated with commercial breaks on a television or radio channel, acquire information associated with advertisements, wherein the advertisements comprises one of regional advertisements and national advertisements, determine the advertisements to be aired during the commercial breaks based on the information acquired and schedule playing of the advertisements during commercial breaks based on the determining. Further, the system includes one or more edge devices for fetching of the advertisements based on the schedule and inserting the advertisements for playing on the television or the radio channel.

DETAILED DESCRIPTION OF THE EMBODIMENTS

The above-mentioned needs are met by a system and a method for managing insertion of advertisements into a television or radio channel. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
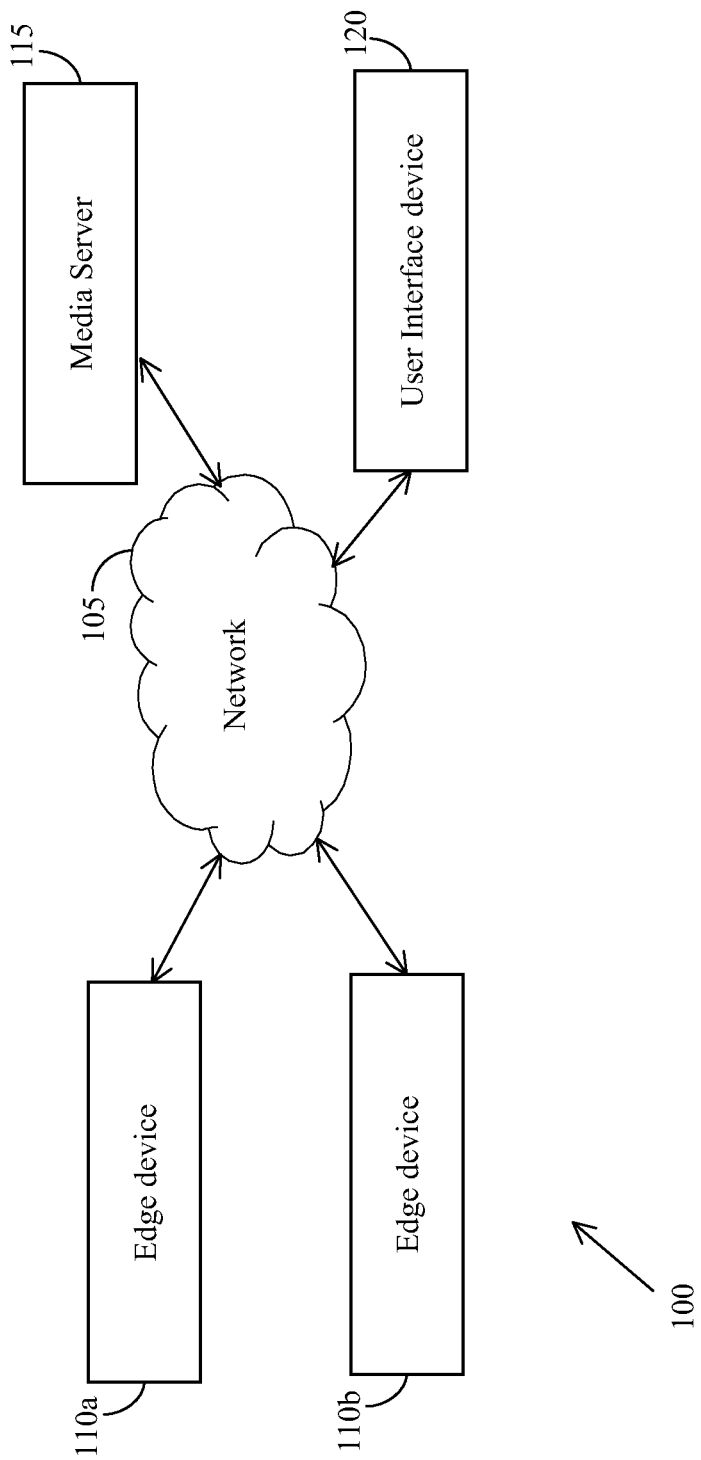
FIG. 1 is a block diagram of an environment, in accordance with which various embodiments can be implemented.

FIG. 1 is a block diagram of an environment 100, in accordance with which various embodiments can be implemented.

The environment 100 includes one or more edge devices, for example an edge device 110a and an edge device 110b connected to the network 105. The environment 100 also includes a user interface device 120 connected to the network 105. Examples of the user interface device 120 include, but are not limited to, computers, mobile devices, laptops, palmtops, hand held devices, telecommunication devices and personal digital assistants (PDAs). The environment 100 also includes a media server 115 connected to the network 105.

The media server 115 is in electronic communication with the edge device 110a, the edge device 110b and the user interface device 120 through the network 105. Examples of the network 105 include, but are not limited to, a Local Area Network (LAN), a Wireless Local Area Network (WLAN), a Wide Area Network (WAN), internet, and a Small Area Network (SAN). The media server 115 can be located remotely with respect to the one or more edge devices and the user interface device 120.

The media server 115 can be regarded as a platform for managing insertion of advertisements. The advertisements for distribution are determined based on a television program genre, geographical area, a television channel, length of the advertisements, prime timeslots, inventory availability and a distribution area. The media server 115 further includes a combination of one or more advertisement servers and one or more content servers that may be connected to the media server 115 locally or remotely over the network 105. The one or more advertisement servers are used to store multiple advertisements. The one or more content servers are used to store various television or radio contents that can be aired on various television or radio channels respectively. The media server 115 is also operable to store user profiles and media plans associated with users. The media server 115 can be laid on a cloud network for providing increased scalability, availability and accessibility. The media server 115 can also be used by the television channel owners to manage insertion of advertisements on a television channel.

The advertisements, for example a national advertisement or a regional advertisement, to be played can be chosen based on geographical location where the television channel is distributed. Hence the media server 115 serves as an intelligent interface for the television channel to play a relevant advertisement on the television channel to create additional revenue opportunities.

The media server 115 also enables scheduling one or more banner advertisements that can be over-laid on the television content on selected positions of the television screen. The media server 115 further performs automatic management of the one or more advertisements to match an order booking placed by the advertisers with a maximum time period allowed for advertising.

In some embodiments, the elements described in environment 100 of FIG. 1 can be used to manage insertion of advertisements on radio channels.

The edge device 110*a* and the edge device 110*b* are connected to the media server 115 through the network 105 to fetch one or more advertisements specific to a user from the media server 115. The edge device 110*a* can also fetch the television or radio content from a broadcasting studio. The edge device 110*a* can further integrate the one or more advertisements and the television or the radio content within a central network feed that is generated at the broadcasting studio.

The edge device 110*a* and the edge device 110*b* can be deployed in one or more distributing stations. Examples of distributing stations include, but are not limited to, central studio, regional Multiple System Operators (MSO) head ends, LCO distribution points, Direct to Home (DTH) up-linking centers, FM or AM Radio Stations and Local Community Radio stations.

In one example, if the edge device 110*a* is deployed at the central studio, then the one or more advertisements scheduled to be aired are fetched by the edge device 110*a* and are inserted in the central network feed. At the central studio, the edge device 110*a* can be integrated with a standard play-out system for inserting the one or more advertisements.

In another example, if the edge device 110*a* is deployed at a television channel distributor such as the regional MSO head-ends, or at the LCO distribution points or at the DTH up-linking centers, then the one or more advertisements scheduled to be aired in specific regions are fetched by the edge device 110*a* for inserting into the television channel for those specific regions. The edge device 110*a* is further configured to switch insertion of the one or more advertisements between at least one of a live studio feed, the central network feed and a local feed.

The user interface 120 is used for providing information associated with commercial breaks and the advertisements. The information includes number of commercial breaks planned within a television or radio program or a day-part, maximum duration allowed for each of the commercial breaks, types of advertisements (national and regional advertisements or a combination of both), time duration of advertisements, rates for playing different types of the advertisements and the like. The information can be provided by television or radio houses that provide slots for advertisements in their channels. The user interface 120 can also be used to input profiles associated with television or radio houses.

Figure 2:
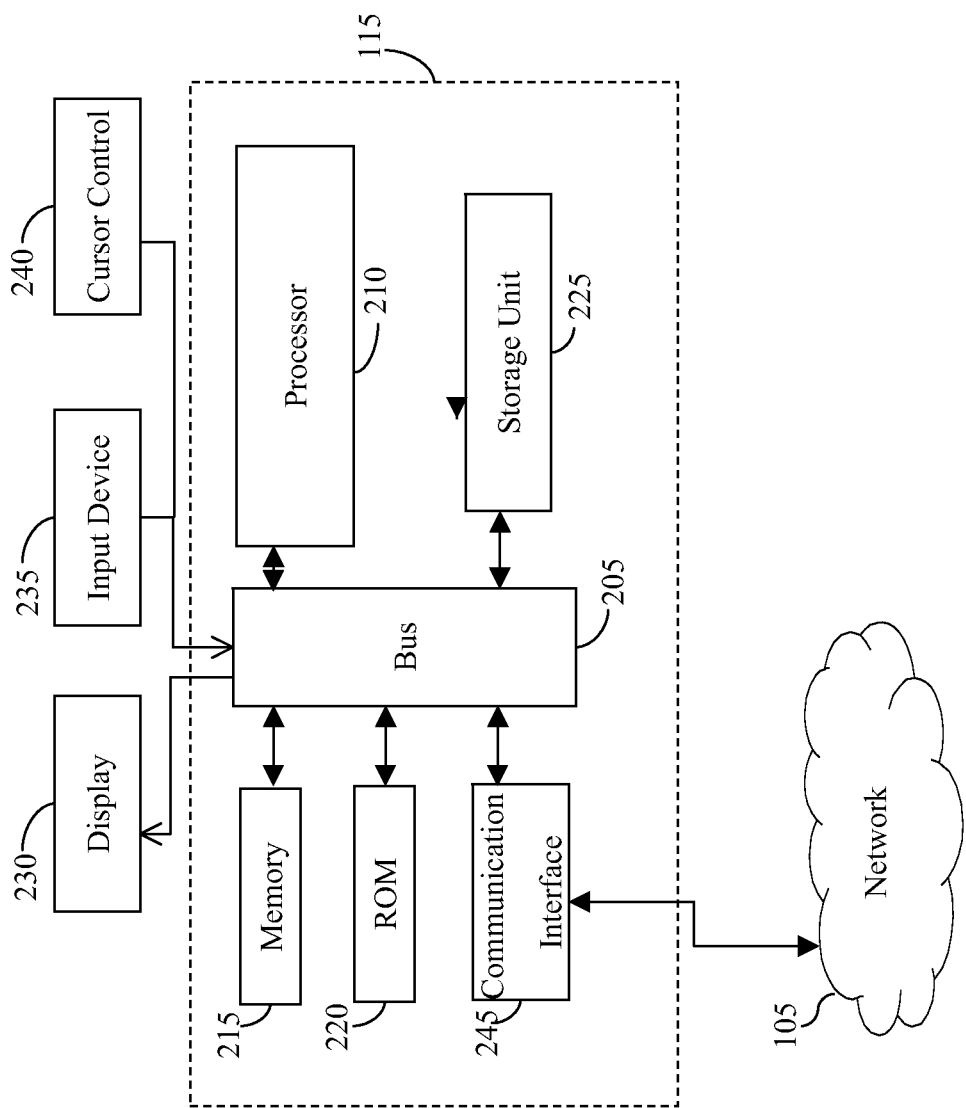
FIG. 2 is a block diagram of a media server for managing insertion of advertisements, in accordance with an embodiment.

The media server 115 including a plurality of elements is explained in detail in conjunction with FIG. 2.

FIG. 2 is a block diagram of a media server for managing insertion of advertisements, in accordance with an embodiment.

The media server 115 includes a bus 205 or other communication mechanism for communicating information, and a processor 210 coupled with the bus 205 for processing information. The media server 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The media server 115 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example information associated with a one or more types of advertisement, various television or radio contents, a list of television or radio channels, information associated with commercial breaks.

The media server 115 can be coupled via the bus 205 to a display 230, for example a cathode ray tube (CRT), for playing the one or more targeted advertisement. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the media server 115 for implementing the techniques described herein. In some embodiments, the techniques are performed by the media server 115 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the media server 115, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described hereinafter or any other media from which the media server 115 can read. For example, the instructions can initially be carried on a magnetic disk of a remote computer. The remote computer can load the instructions into its dynamic memory and send the instructions over a telephone line using a modem. A modem local to the media server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The media server 115 also includes a communication interface 245 coupled to the bus 205. The communication interface 245 provides a two-way data communication coupling to the network 105. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the media server 115 receives the information associated with commercial breaks on a television or radio channel. The processor 210 also acquires information associated with the advertisements. The advertisements include one of regional advertisements and national advertisements. The processor 210 further determines the advertisements to be aired during the commercial breaks based on the information acquired and schedules playing of the advertisements. An edge device, for example, the edge device 110*a* fetches the advertisement from the media server 115 based on the schedule and further inserts the advertisements for playing into the television or radio channel feed. The edge device 110*a* can also include a plurality of elements similar to the elements of the media server 115 described in FIG. 2 for performing various functions for managing insertion of advertisements.

Figure 3:
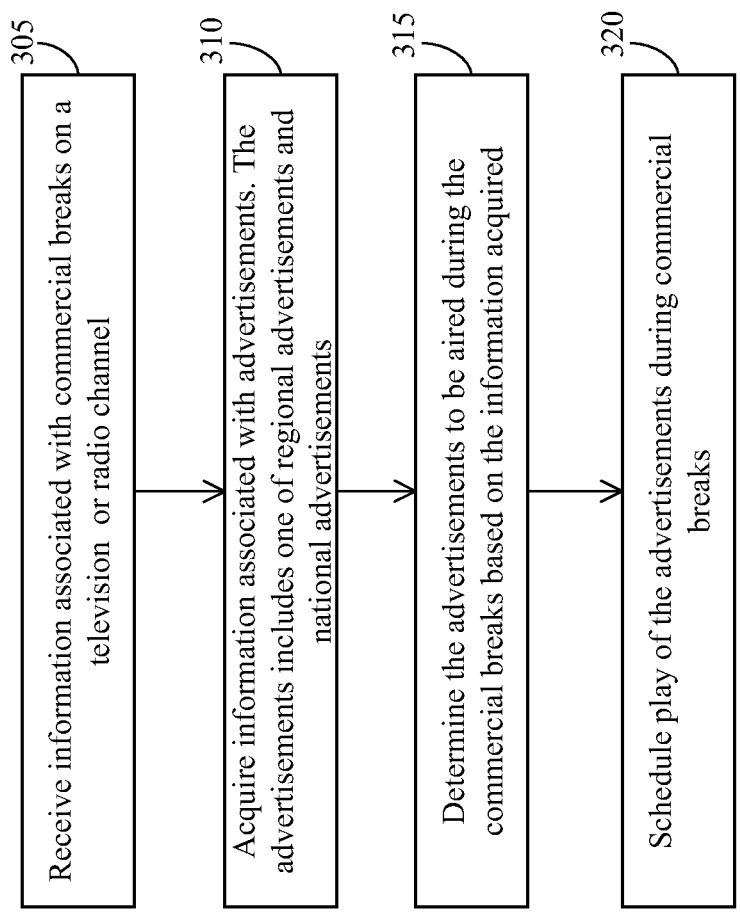
FIG. 3 is a flowchart illustrating a method of managing insertion of advertisements, in accordance with an embodiment.

FIG. 3 is a flowchart illustrating a method of managing insertion of advertisements, in accordance with an embodiment.

Television or radio networks (or Broadcast networks) typically broadcast one or more television channels or radio channels. The television or radio networks sell airtime for advertisers in the one or more television channels or radio channels for marketing their products during commercial breaks.

In an embodiment, the television or radio networks manage insertion of the advertisements by means of elements described in environment of FIG. 1. The advertisements that are to be aired on the television or radio channels are sent to the media server 115. Type of advertisements includes one of regional advertisements and national advertisements. In addition, information such as advertisement duration, cost of airing the advertisements during different timeslots or pre-defined duration, region of distribution and the corresponding cost in the region of distribution are input to the media server 115 using the user interface 120.

At step 305, information associated with commercial breaks on a television or radio channel is received by the media server 115.

In one embodiment, the time of insertion of the commercial breaks can be provided prior to the actual broadcast in the television or radio channel.

In another embodiment, the time of insertion of commercial breaks can be determined dynamically during the actual broadcast of the television or radio channel by configuring timing of the insertion of the mark-in or mark-out montage by a studio editor.

At step 310, information associated with advertisements is acquired. The information include the types of advertisements, advertisement duration, cost of airing the advertisements during different timeslots, cost of airing the advertisements during pre-defined duration, the region of distribution of the advertisements and the corresponding costs for the advertisements in the region of distribution.

At step 315, the advertisements to be aired during the commercial breaks are determined based on the information acquired.

The media server 115 calculates rates for one or more national advertisements to be played during commercial breaks. The media server 115 also calculates cumulative rates for regional advertisements to be played during the commercial breaks across multiple regions. Further, a maximum revenue is estimated from a combination of the national advertisements and the regional advertisements to be played during the commercial breaks across the multiple regions. The combination of the national advertisements and the regional advertisements with the maximum revenue is selected for airing during the commercial break across multiple regions.

For example, a national advertisement 'A' costs 100$ for advertising nationally across a commercial break of 10 second timeslot on the television channel. The national reach is inclusive of three regions. Further, a regional advertisement 'B' costs 35$ for advertising in first region, a regional advertisement 'C' costs 40$ for advertising in second region and a regional advertisement 'D' costs 40$ for advertising in third region during the same 10 second time slot on the television channel. The media server 115 determines revenue from airing the regional advertisements during the 10 second timeslot exceeds revenue from airing national advertisement during the 10 second timeslot.

At step 320, the advertisements are scheduled for playing during commercial breaks. The advertisements are selected based on the combination of the national advertisements and the regional advertisements determined in step 315.

The advertisements are scheduled for distribution on the television or the radio channel across multiple regions. The scheduling can be performed by the media server 115. The advertisements may be scheduled prior to distribution on the selected television or radio channels. The advertisements can further be scheduled based on the availability of the advertisements prior to distribution on the television or the radio channels.

In an embodiment, the advertisements are scheduled for distribution on the central network feed of the television or the radio channel. The advertisements can be scheduled by including the Mark-In/Mark-Out Montage that are specific to the television or the radio channel. Once the advertisements are scheduled, information associated with airing of the advertisements is provided to the different edge devices, for example the edge device 110a and the edge device 110b.

The advertisements scheduled for distribution are fetched from the media server 115. The fetching of the advertisements from the media server 115 can be performed by the edge device 110a that can be deployed at various distribution stations.

In some embodiments, the banner advertisement that is scheduled is fetched from the media server 115 for overlaying on the television channel in selected positions of the television screen.

The advertisements fetched are inserted onto feed of the television or the radio channel for playing. The edge devices identify the mark-in/mark-put montage on the feed of the television or the radio channel to insert the fetched advertisements.

In one example, the advertisements are inserted in the central network feed if the edge devices are deployed at the central studio. The method further includes, integrating the edge device 110a with a standard play-out system at the central studio for inserting the advertisements.

In another example, the advertisements are inserted into a television or a radio channel that are viewed by a specific set of users subscribed with a television channel distributor such as the regional MSO head-ends, or at the LCO distribution points or at the DTH up-linking centers, if the edge device 110a is deployed at the television channel distributor.

In some embodiments, an audio advertisement is inserted can also be into a radio channel.

In some embodiments, the commercial breaks may not be utilized completely by the national or regional advertisements. In such a case, low-cost advertisements (Value Buy ads) are inserted to fill the commercial breaks. The Value-buy ads are priced lower and are inserted only if inventory is not utilized by the national or the regional advertisements to utilize the unused airtime to maximize the revenue. If the commercial breaks are not fully utilized even after the insertion of the Value-buy ads, then fillers and promos of the television or radio channels are inserted to fill the commercial breaks completely. Further, proof of play reports can be provided for the insertion of the advertisements, the value buy ads, fillers and the promos.

The system specified in the present disclosure enables a method for managing insertion of advertisements into a feed of television channel. The system also serves as an intelligent interface for television networks for inserting relevant advertisements into the television channels and creating additional revenue opportunities. The system can also be placed on a cloud network providing for high scalability, availability and accessibility. The system is also extensible to manage insertion of audio advertisements into a radio channel.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of managing insertion of advertisements, the method comprising steps of:
   receiving information associated with commercial breaks on a television channel with a media server, and wherein the media server is located on a cloud network;
   acquiring information associated with advertisements, wherein the advertisements comprise one of regional advertisements and national advertisements;
   determining the advertisements to be aired during the commercial breaks based on the information acquired; and
   inserting one of low-cost advertisements or value-buy advertisements and promotional videos of television channel during the commercial breaks, and wherein the low-cost advertisements are priced lower and inserted only when an inventory is not utilized by national or regional advertisements to utilize an unused airtime to maximize revenue;
   inserting fillers of the television channels to fill the commercial breaks, when the commercial breaks are not utilized fully even after the insertion of low cost advertisements or value buy advertisements;
   scheduling playing of the advertisements during commercial breaks based on the determining;
   wherein the step of determining comprises;
   calculating rates for one or more national advertisements to be played during commercial breaks;

calculating cumulative rates for regional advertisements to be played during the commercial breaks across multiple regions;

estimating maximum revenue from a combination of the national advertisements and the regional advertisements to be played during the commercial breaks across the multiple regions; and selecting the combination of the national advertisements and the regional advertisements based on the estimating;

scheduling the advertisements by including a Mark-in/mark out Montage that are specific to a television channel or radio channel; and identifying the Mark-in/mark-out Montage on a feed of a television channel for inserting the advertisements; and wherein a time of insertion of commercial breaks is determined in dynamic manner during an actual telecast broadcast of television channel, by configuring a timing of the insertion of the Mark-in/mark out Montage.

2. The method as claimed in claim 1 further comprising steps of:
fetching of the advertisements based on the scheduling; and
inserting the advertisements for playing on the television channel.

3. The method as claimed in claim 1, wherein information associated with the advertisements includes time duration of advertisements, type of advertisements and rates for playing of the advertisements.

4. The method as claimed in claim 1, wherein one of the national advertisements and the regional advertisements are played across the multiple regions based on the estimating.

5. The method as claimed in claim 1, wherein the method of managing the insertion of the advertisements is performed successively after predefined time duration.

6. The method as claimed in claim 2, wherein the inserting of the advertisements is performed from a remote location.

7. The method as claimed in claim 2 further comprises inserting video advertisements during the commercial breaks on the television channel.

8. The method as claimed in claim 2 further comprises inserting banner advertisements during the commercial breaks on the television channel.

9. The method as claimed in claim 2 and further comprises inserting an audio advertisement during the commercial breaks on a radio channel.

10. A system for managing insertion of advertisements, the system comprising:
a user interface for providing information associated with commercial breaks and advertisements;
a media server comprising;
a memory that stores instructions; and
a processor configured to execute in responsive to the instructions to;
receive information associated with commercial breaks on a television channel;
acquire information associated with advertisements, and wherein the advertisements comprise one of regional advertisements and national advertisements;
determine the advertisements to be aired during the commercial breaks based on the information acquired;
schedule playing of the advertisements and during commercial breaks based on the determining;
one or more edge devices for fetching of the advertisements based on the schedule, and inserting the advertisements for playing on the television channel;
wherein the media server is configured to calculate rates for one or more national advertisements to be played during commercial breaks, to calculate cumulative rates for regional advertisements to be played during the commercial breaks across multiple regions, to estimate maximum revenue from a combination of the national advertisements and the regional advertisements to be played during the commercial breaks across the multiple regions, and to select the combination of the national advertisements and the regional advertisements based on the estimating, and wherein the one or more edge devices are further configured to insert one of low-cost advertisements and promotional videos of television channel, an wherein the low cost advertisements are priced lower and inserted only when an inventory is not utilized by national or regional advertisements to utilize an unused airtime to maximize revenue, and wherein the media server is laid on a cloud network, and wherein the advertisements are scheduled by including a Mark-in/mark-out Montage that are specific to a television channel or radio channel; and wherein the Mark-in/mark-out Montage on a feed of a television channel are identified for inserting the advertisements; and wherein fillers of the television channels are inserted to fill the commercial breaks, when the commercial breaks are not utilized fully even after the insertion of low cost advertisements or value buy advertisements, and wherein a time of insertion of commercial breaks is determined in a dynamic manner during an actual telecast broadcast of television channel, by configuring a timing of the insertion of the Mark-in/mark out Montage.

11. The system as claimed in claim 10 wherein the one or more edge devices are deployed on a plurality of distribution stations.

12. The system as claimed in claim 10 wherein the one or more edge devices are further configured to insert video advertisements during the commercial breaks on the television channel.

13. The system as claimed in claim 10 wherein the one or more edge devices are further configured to insert banner advertisements during the commercial breaks on the television channel.

14. The system as claimed in claim 10 wherein the one or more edge devices are further configured to insert audio advertisements during commercial breaks on a radio channel.

* * * * *